United States Patent [19]
Uchida et al.

[11] 3,964,168
[45] June 22, 1976

[54] SCANNING MECHANISM FOR A LASER SCRIBER
[75] Inventors: Teiji Uchida; Takayuki Mizutani, both of Tokyo, Japan
[73] Assignee: Nippon Electric Company Limited, Tokyo, Japan
[22] Filed: Jan. 6, 1975
[21] Appl. No.: 538,783

[30] Foreign Application Priority Data
Jan. 8, 1974 Japan............................ 49-5875[U]
June 26, 1974 Japan.......................... 49-75262[U]
June 26, 1974 Japan.......................... 49-75263[U]

[52] U.S. Cl. ................................. 33/1 M; 33/19 A
[51] Int. Cl.² ....................................... G03B 23/08
[58] Field of Search............... 33/19, 32, 18 R, 189, 33/1 M

[56] References Cited
UNITED STATES PATENTS
2,303,299 11/1942 Finn.................................. 33/19 A
3,744,891 7/1973 Dennis et al......................... 33/1 M Primary Examiner—William D. Martin, Jr.
Attorney, Agent, or Firm—Hopgood, Calimafde, Kalil, Blaustein & Lieberman

[57] ABSTRACT

A locking device for the scanning mechanism of a laser scriber of the type having a stationary laser head comprises an actuator operable in association with the table drive mechanism and a presser element operable under the action of the actuator to move one of the scanning tables against the guide structure provided for the table to prevent oscillatory or other displacement of the table in its guided direction during the scanning movement of the other table. As a result, a practically true straight line of scan is obtained, thereby eliminating the danger of the laser beam incising the work sheet beyond a definite range of allowance.

10 Claims, 13 Drawing Figures

U.S. Patent   June 22, 1976   Sheet 1 of 5   3,964,168
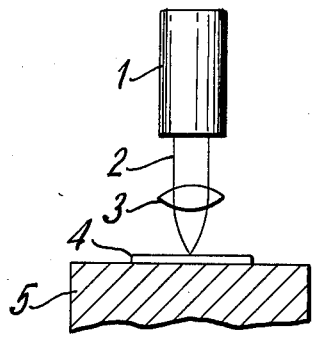
FIG. 1
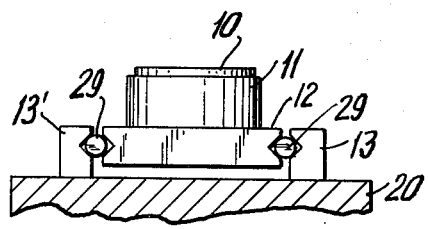
(PRIOR ART)
FIG. 3
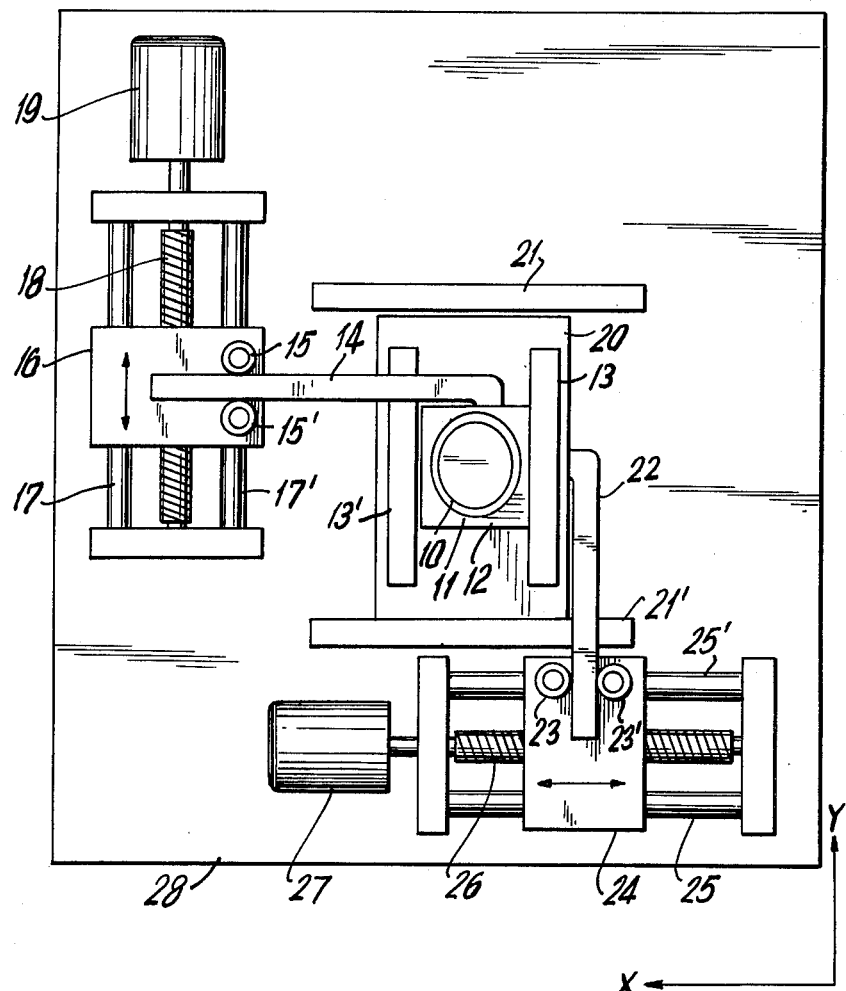
(PRIOR ART)   FIG. 2

SCANNING MECHANISM FOR A LASER SCRIBER

BACKGROUND OF THE INVENTION

This invention relates generally to laser scribers which are employed to scan thin work sheets, such as semiconductor wafers, with a laser beam, and more particularly to laser scanning mechanisms of the type having a stationary laser head which are operable to move the work sheet relative to the stationary laser beam.

Laser scribers are conventionally used to form scores or shallowly notched lines in the surface of thin sheets, such as silicon wafers with integrated circuits (IC) previously formed thereon, and ceramic sheets, by irradiating the work surface with a narrowly focused laser beam, thereby to facilitate the splitting or severing of such thin sheet works into pellets of desired size.

Such severing is performed for the purpose of separating a large number of IC or other microcircuit elements formed on a common thin sheet from each other, and is usually effected along two sets of regularly spaced lines extending at right angles to each other. In order to enable such severing operation, the work sheet must, of course, be scanned with a laser beam along each line of separation.

The scanning operation may be performed by displacing the laser head in the same manner as a diamond edged cutter used in conventional scribers but, with laser scribers, such design is generally undesirable due to the limited strength of the laser head structure to withstand mechanical vibration. It is thus recommended for ease and simplicity in design and for efficiency of operation, to displace the work sheet relative to a stationary laser head.

On the other hand, microcircuit elements such as IC formed on a silicon wafer are closely arranged thereon in rows at right angles to each other, as stated above, thereby leaving an allowance of only a few ten microns for scoring. This requires that the scanning of the laser beam be effected along a practically true straight line without any deflection therefrom.

In the use of a laser scriber of the type including a stationary laser head and a work-carrying mechanism in which two tables are movable in respective planes parallel to the plane of the work sheet and in respective X and Y directions at right angles to each other, the common practice has previously been to place one of the two tables at rest simply by rendering drive means provided for the table ineffective or by interrupting the driving connection therewith. In this arrangement, the table that is presumably at rest is unavoidably guided with some lateral play to cause undesired scanning deflection under the effect of machine vibration or other external disturbances. In other words, it has been impossible in the prior art laser scanning arrangements to avoid oscillatory or other deflection of the actual line of scan from its intended course during scanning in either of the two (X and Y) directions. For example, in scoring a silicon wafer with IC formed thereon with a conventional scanning mechanism, the laser irradiation is often extended beyond the limits of scoring allowance to impair the IC region of the wafer, thus providing damage that results in an increased number of rejects in the IC products finally obtained.

In an attempt to deal with this problem, it has been proposed to design work-carrying structure that is capable of displacing the work sheet relative to the laser beam with exceptionally high accuracy. A structure capable of operating in this manner must, however, inevitably be of increased weight and inertia, making it difficult to effect high-speed scanning and to form a factor of scanning deflection due to the increase in driving effort required therefor.

SUMMARY OF THE INVENTION

It is thus an object of the present invention to provide a laser scriber scanning mechanism which is highly valuable in practice, making it possible to score work sheets substantially without any scanning deflection.

It is a specific object of the invention to provide, for a work-carrying mechanism of a laser scriber of the type having a stationary laser head, a locking device that acts during scanning in either of two directions at right angles to each other to lock one of two movable tables of the mechanism that is guided in directions at right angles to the instant scanning direction against displacement in guided directions.

According to the present invention, either of the two movable tables can be locked when desired under a thrust which forces the table against the guide structure provided therefor to eliminate any lateral play therebetween. For example, during scanning in the X direction, that table which is provided for scanning in the Y direction is pressed against the guide structure provided for the table. As will readily be understood, since the pressure is directed in the same direction as that in which scanning is effected, that is, in the X direction, limited displacement of the table and hence of the work sheet resulting under such pressure is directed in the X direction and does not cause any error in scanning location. Upon completion of each scan of the X direction, the locking pressure upon the Y table, or the table guided for scanning in the Y direction, is released to free the Y table, which is then shifted a predetermined pitch distance in the Y direction and locked again for the next scan in the X direction. In this manner, the Y table is locked and released for each cycle of scanning in the X direction.

For scanning in the Y direction, the X table is locked to the guide provided therefor and is released therefrom to be shifted a pitch distance for each scanning cycle.

As a thrust mechanism, any known form of actuator can be employed which is operable under air, oil or other fluid pressure or by electromagnetic means.

The above and other objects, features and advantages of the present invention will become apparent from the following description when taken in conjunction with the accompanying drawings, which illustrate a few presently preferred embodiments of the invention.

BRIEF DESCRIPTION OF THE DRAWINGS

In the drawings:

FIG. 1 is a schematic side elevation illustrating the principle of a laser scriber;

FIG. 2 is a plan view of the scanning or work-carrying mechanism of a conventional laser scriber of the type having a stationary laser head;

FIG. 3 is a side elevation showing the movable tables and one of the associated guide structures of the scanning mechanism shown in FIG. 2;

DESCRIPTION OF THE PREFERRED EMBODIMENTS

Figure 4:
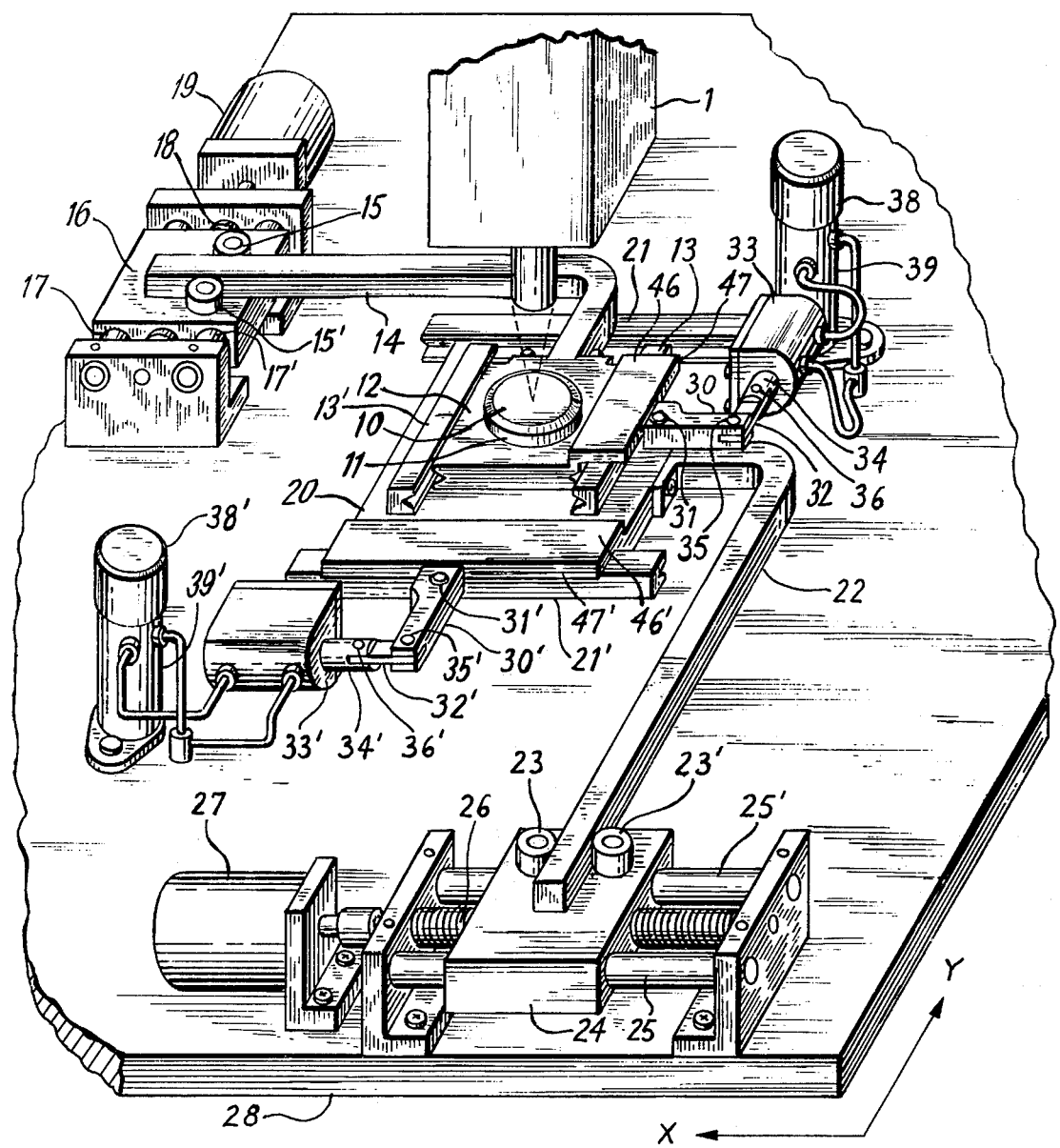
FIG. 4 is a perspective view, partially fragmented, showing a laser scriber scanning mechanism according to one embodiment of the present invention.

Referring first to FIG. 1, which illustrates the principle of a laser scriber, a stationary laser head 1 emits a laser beam 2, and a focusing means such as a lens 3 collects and focuses the laser beam 2 to an extremely small cross-sectional size. The laser beam thus collected irradiates a work sheet 4, which may be, for example, a semiconductor wafer or a ceramic sheet securely mounted on a movable table 5 so as to form a shallow notch or cut in the surface of the work sheet 4. As the table 5 is moved straight in a plane parallel to that of work sheet 4, the sheet surface is scored in a straight line. The work sheet thus scored can be readily split or severed along the lines of score into discrete segments or pellets by applying to the sheet external force directed normal to the sheet surface. In cases where the laser beam has a sufficiently high intensity, such splitting step employing external forces may be omitted by deep cutting the work sheet. Such laser cutting, however, would require a much greater scoring allowance on the work sheet and would cause a substantial rise in temperature and hence a problem of thermal distortion of the work sheet. In practice, therefore, the laser processing is usually effected only to serve the purpose of scribing or scoring lines to facilitate the splitting of the work sheet into segments.

A description is now given of the scanning or work-carrying mechanism of a conventional laser scriber of the type having a stationary laser head with reference to FIG. 2. In the following, a semiconductor wafer is taken as a typical example of a thin sheet that is to be worked.

In FIG. 2, a first movable table 20 is arranged over a stationary base plate 28 and is guided for movement in the X direction by rails 21 and 21' fixed to the base plate. A second movable table 12 is arranged over the first movable table 20 and guided for movement in the Y direction by rails 13 and 13' secured to the first table 20. Secured to the top of the second table 12 is a work mount 11 on which a semiconductor wafer 10 is mounted and held in place as by suction.

Referring to FIG. 3, guide rails 13 and 13' provided for the second table are each formed with V grooves which cooperate with respective similar grooves formed in the opposite sides of the table 12 to receive balls 29, thereby to enable the table to move smoothly along the guide rails 13 and 13' in the Y direction. It is to be understood that a similar ball and groove arrangement is provided between the first movable table 20 and guide raile 21 and 21'.

Referring again to FIG. 2, an arm 14 is fixed to the Y table 12, extending therefrom leftward in the X direction, and is slidably embraced by a pair of freely rotatable rollers 15 and 15', which are fixedly mounted on a slide 16, which in turn is guided by a pair of guide rods 17 and 17' to slide in the Y direction, as indicated by the arrow, with the rotation of a feed screw 18 connected to the output shaft of an electric motor 19 and extending through the slide 16 in threaded relation thereto. With the movement of the slide 16 in the Y direction, the arm 14 is laterally moved in the same direction by means of rollers 15 and 15' to drive the Y table 12 in the same direction. The wafer 10 is thus scanned in the Y direction.

Similarly, the X table 20 is movable in the X direction with the rotation of a feed screw 26 (FIG. 2), which is connected with the output shaft of an electric motor 27, by means of a driving arrangement which includes an arm 22 fixed to the table 20 and extending therefrom in the Y direction and a pair of rollers 23 and 23' embracing the arm 22 and mounted on a slide 24. The latter is guided by a pair of guide rods 25 and 25' for movement in the X direction. Since the guide rails 13 and 13' for Y table 12 are fixed to the X table 20, as described, the wafer 10 mounted on Y table 12 is scanned in the X direction in which the table 20 is moved. It is to be noted that during the scanning in the X direction, the arm 14 freely slides between the rollers 15 and 15', causing no obstruction to the scanning movement of the X table 20.

By use of the scanning mechanism shown in FIG. 2, two sets of spaced parallel score lines extending at right angles to each other can be obtained on the surface of the wafer by repeating the scanning movement, for example, first of the X table 20 and then of the Y table 12, as follows. First, with the Y table 12 left at rest in a predetermined position, the X table 20 is moved from one end to the other of its scanning stroke to obtain a straight score line of the wafer. The Y table 12 is then displaced a predetermined pitch distance in the Y direction while the X table 20 is moved back to the starting end of its stroke in preparation for another scanning stroke. This cycle of operations is repeated until a desired set of score lines are obtained on the wafer. Alternatively, the displacement in the Y direction may take place every time the X direction scanning reaches one end. Thus, the Y table 12 is repeatedly moved from one end to the other of its scanning stroke to form another set of score lines on the wafer which are at right angles to the set of score lines previously formed on the wafer. Of course, this time the X table 20 is left at rest during each scanning stroke of the Y table 12 and pitched each time such stroke is completed.

As will readily be noted, however, for example, during the scanning stroke of the X table 20, the Y table 12 may oscillate in the Y directions inasmuch as it is not held perfectly still relative to the X table 20. This results in the formation on the wafer of a score line which is not perfectly straight but is more or less wavy. Such score line may extend into the IC or other elements formed on the wafer and may damage such elements because of the very limited scoring allowance, usually a few ten microns, of the wafer.

Conventionally, in the scanning mechanism as shown in FIG. 2, either of the X and Y tables has been left substantially free to move in directions in which it is guided even when the table is required to be at rest and, during the scanning operation in either the X or Y direction, a deflection of the order of 30 microns usually occurs which results in a substantial number of rejects.

FIG. 4 illustrates an embodiment of the present invention as applied to a laser scanning mechanism. In FIG. 4, only essential portions of the mechanism and associated means for locking the Y table against movement relative to the X table are shown. The same reference numerals are used for all elements in the embodiment that are common to the prior art mechanism of FIG. 2.

In the arrangement illustrated in FIG. 4, the X table 20 has fixedly mounted thereon a pneumatic actuator including a cylinder 33 fixed to the table and an output member here shown as a piston 34 slidably fitted in the cylinder. A presser element, here shown in the form of a two-armed lever 30, is fulcrumed on the table 20 by means of a pivot pin 31 fixed thereto and having a shorter arm 43 and a longer arm the end of which is pivotally connected with a link 32, which in turn is pivotally connected with the end of a rod formed integral with the piston 34. A spool valve 39 is provided to control the pneumatic actuator, and a solenoid 37 including a plunger 38 is formed integral with the valve element 40 of the spool valve 39. A restoring spring 41 is provided for the solenoid-valve assembly; and an air compressor 42 communicates with the spool valve 39 and actuator 33. In FIG. 4, the locking device is shown assuming an ineffective state with the solenoid 37 de-energized. In this state, the plunger 38 is in its lower position under the bias of spring 41, placing the valve element 40 of spool valve 39 in a position as shown in the figure, so that pressure air from the compressor 42 proceeds as indicated by the arrows to be fed into both cylinder spaces 43 and 44 formed on the opposite faces of the piston 34. As a result, the piston 34 is forced toward or downward, as viewed in FIG. 4, since its rear face is larger in area than its front face, which is annular. Under this situation, the two-armed lever 30 is held in a position spaced apart from the adjacent side face 47 of an overhang portion 46 of the Y table 12, as shown.

Figure 5:
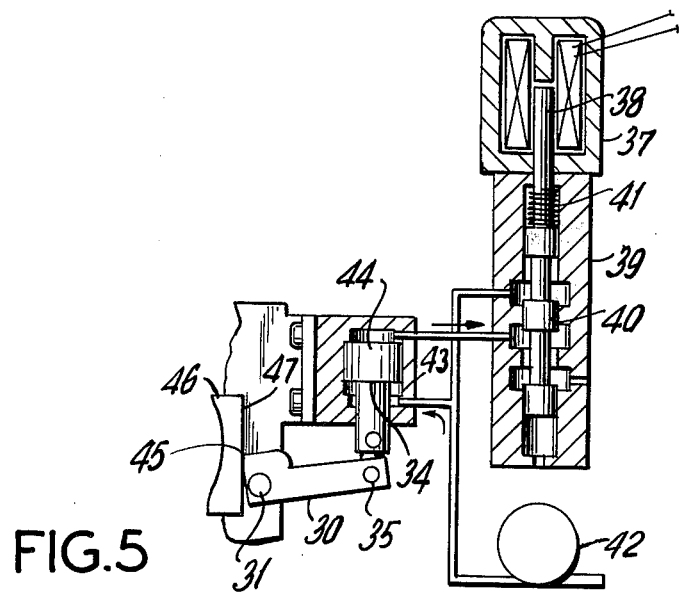
FIG. 5 is a fragmentary view of the embodiment of FIG. 4, showing a locking device in the locking position.

FIG. 5 illustrates the locking device in a state that is assumed when the solenoid 37 is energized. In this state, plunger 38 is in a position drawn upwardly together with the spool valve element 40 and the cylinder space 44 on the rear face of the actuator piston 34 is exhausted, the air previously fed in the space escaping to the atmosphere proceeding as indicated by the arrows. However, the cylinder space 43 remains under air pressure and thus the actuator piston 34 is forced rearward or upward, as viewed in the figure, to rock the lever 30 counterclockwise about the axis of pivot pin 31 so that the lever tip or the end 45 of the shorter arm of lever 30 is brought into engagement with the side face 47 of overhang portion 46 of the Y table 12, thereby to press the table against the guide structure provided therefor in a lateral direction. This necessarily results in a slight displacement of the Y table 12 in the X direction, but such displacement does not present any problem as the scanning is to be effected in the X direction in this instance.

The pneumatic actuator 33 is apparently moved together with the X table 20 when the latter is driven for scanning in the X direction as the actuator is fixedly mounted on the table. Use should, therefore, be made of flexible hoses as the means for fluid communication between the actuator 33 with the control valve 39 and with air compressor 42.

As will readily be understood, any oscillatory or other displacement of the X table 20 during scanning in the Y direction can be prevented by providing locking means similar to that shown and described above with reference to FIGS. 4 and 5 between the X table 20 and the base plate indicated at 28 in FIG. 2.

It has been found that with the use of such locking device the width of scanning deflection can be reduced to five microns or less and a laser scriber can be realized with each which is capable of scoring work sheets efficiently within the limited range of scoring allowance, usually of a few ten microns, and highly valuable in practical applications.

Figure 6:
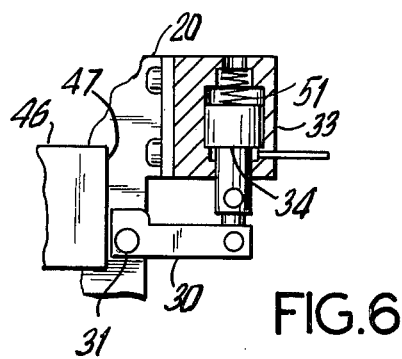
FIG. 6 illustrates a modification of the actuator used in the locking device shown in FIGS. 4 and 5.
Figure 7:
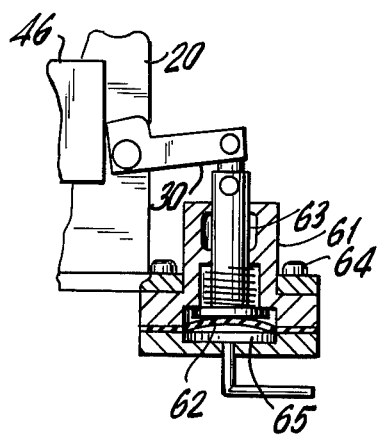
FIG. 7 is a view showing another modification of the actuator.
Figure 8:
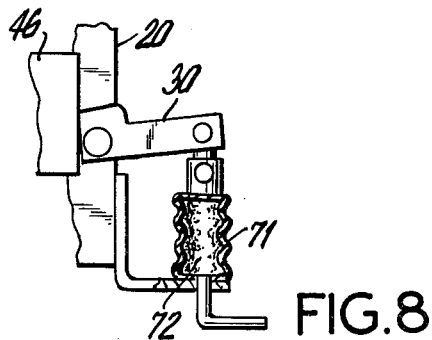
FIG. 8 is a view showing a further modification of the actuator.

Although in the embodiment described above, a pneumatically operated actuator is employed as means for operating the presser lever 30, various modifications may be made therein, for example, as described below with reference to other embodiments of the invention, and with the same successful results.

a. Although the actuator 33 employed in the embodiment of FIGS. 4 and 5 is so designed that its piston 34 is operated in either direction by the difference between the pneumatic forces acting upon the opposite faces thereof, it may also be designed so as to drive the piston 34 pneumatically in one direction alone with a biasing spring 51 arranged to restore the piston to its normal position, as shown in FIG. 6.

b. The actuator may be of a diaphragm-operated type, as illustrated in FIG. 7, including a casing 61, an operating rod 63 biased in one direction by a spring 64, and a diaphragm 62 operable to drive the rod 63 forward under air pressure fed in a space 65 defined in the casing 61.

c. The actuator may also take the form of a bellows as indicated at 71 in FIG. 8, which is extended under air pressure fed in its interior space 72.

d. In either of the forms of the actuator described above, oil may be employed as an operating fluid instead of air.

e. Vacuum may also be employed to produce a pressure difference required for the operation of the actuator.

f. Although in the embodiment of FIG. 4, the lever 30 is so arranged that its engaging end 45 is normally held spaced a definite distance from the side face 47 of overhang portion 46 of the Y table 12 for scanning in the Y direction, it may also be arranged so as to normally hold the lever end 45 in light contact with the side face 47, the pressure of contact being increased when required for scanning in the X direction.

g. Pressure control valve 39 may take any of known forms other than that illustrated as long as it serves the intended function.

h. The actuator may be made of an electromagnet linked directly with the two-armed lever 30.

Figure 9:
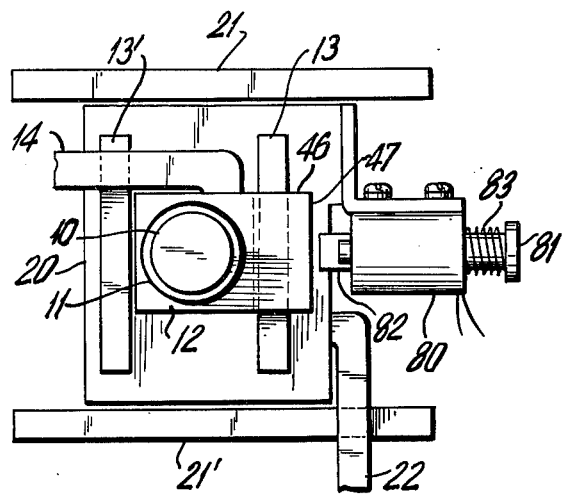
FIG. 9 is a plan view of another embodiment of a laser scriber scanning mechanism according to the present invention.

Another example of a laser scriber scanning mechanism embodying the present invention is illustrated in FIG. 9, which is generally similar to the embodiment shown in FIG. 4 except that it employs a solenoid as the table locking actuator.

In FIG. 9, a solenoid 80 is fixedly mounted on the X table 20 and is shown in its de-energized state. The solenoid 80 includes a plunger 71 and a coiled spring 83 for biasing the plunger 71 to its normal position. A presser element 82 is integrally secured to the plunger 81 in a position opposite to the overhang portion 46 of Y table 12.

Upon energization of the solenoid 80, plunger 81 is drawn inwardly toward the Y table 12 so that the presser element 82 is brought into pressure engagement with the side face 47 of overhang portion 46 of the Y table 12, thereby to lock the table against displacement relative to the X table 20 to which the solenoid 80 is fixed. As will be readily appreciated, with this arrangement as in the earlier described embodiments of the invention, any oscillatory or other displacement of the Y table 12 is effectively prevented during scanning movement of the X table 20 for scanning in the X direction along a practically true straight line.

It will readily be understood that any oscillatory or other movement of the X table 20 during scanning movement of the Y table 12 can be prevented by providing similar locking means between the X table 20 and the base plate 28 in FIG. 2.

Also, with the embodiment of FIG. 9, it has been found that the width of scanning deflection can be reduced to five microns or less and a laser scriber can be realized which is capable of scoring thin sheets efficiently within the limited range of scoring allowance, usually of a few ten microns, and is highly valuable for use in practical applications.

Figure 10:
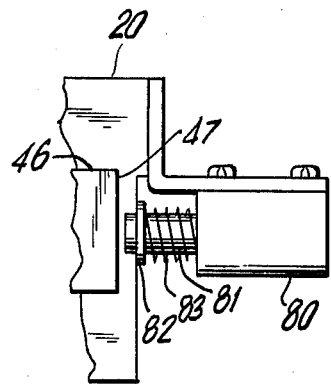
FIG. 10 is a fragmentary plan view showing a modification of the embodiment of FIG. 9.

Although in the embodiment of FIG. 9, use is made of a solenoid 80 with plunger 81 arranged to be drawn toward the overhang table portion 46 upon energization of the solenoid, various modifications may be made therein, for example, as described below and with the same successful results:

a. In one modification shown in FIG. 10, the bias spring 83 is so arranged that upon energization of the solenoid 80 the plunger 71 is drawn against the spring bias to separate the presser element 82 from the side face 47 of overhang portion 46 of the table 12. Upon de-energization of the solenoid the plunger is restored under the spring bias to place the presser element 82 in pressure engagement with the side face 47 of the overhang table portion 46;

b. In another modification shown in FIG. 11, a fluid-operated actuator 90 is employed which includes a piston 92 slidably fitted in a cylindrical chamber 91 in which oil or air under pressure is fed to drive the piston forwardly so that a pressure element 93 integrally secured to the forward end of the piston 92 is pressed against the side face 47 of the overhang table portion 46;

c. A further modification shown in FIG. 12 employs a diaphragm-operated actuator 61 which includes a diaphragm 62 made of rubber or a like material and operable under oil or air pressure to drive forward a pressure element 93 arranged in front thereof and place such element in pressure engagement with the side face 47 of the overhang table portion 46;

d. In another modification shown in FIG. 13, the actuator takes the form of a bellows 71, which is extended under oil or air pressure fed in its interior space 72 to place a presser element 93, mounted on the bellows, in pressure engagement with the side face 47 of the overhang table portion 46.

Figure 11:
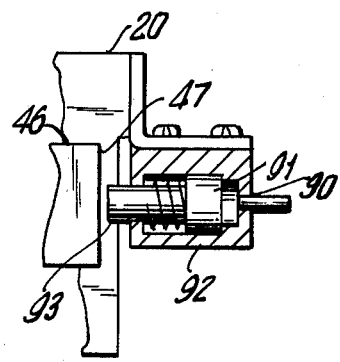
FIG. 11 illustrates a pneumatically or oil-hydraulically operated actuator usable with the embodiment shown in FIG. 9.
Figure 12:
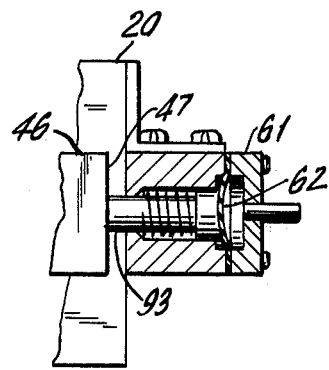
FIG. 12 illustrates a modification of the actuator shown in FIG. 11.
Figure 13:
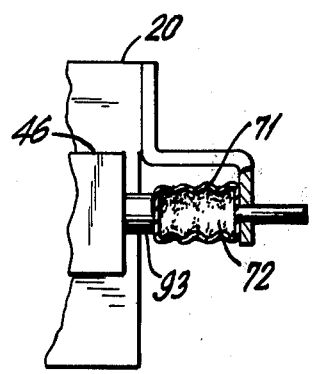
FIG. 13 illustrates another form of an actuator usable with the embodiment of FIG. 9.

As will readily be noted, the forms of actuator shown in FIGS. 11, 12 and 13 may further be modified so as to be operated by vacuum means instead of by oil or air pressure means.

It will be readily appreciated from the foregoing description of several embodiments of the invention, that the present invention provides a locking device for the scanning mechanism of a laser scriber of the type having a stationary laser head, which enables the mechanism to scan thin sheets, such as semiconductor wafers, in a practically true straight line well within the limited scoring allowance. Any incision damage to circuit elements formed thereon is thus effectively prevented and the percentage of rejections in the following wafer-splitting stage is significantly reduced.

Although the laser scanning mechanism of the invention has been therein specifically described with respect to several embodiments thereof, it will be appreciated that modifications may be apparent to those skilled in the art which will still be within the spirit and scope of the invention.

What is claimed is:

1. A scanning mechanism for a laser scriber comprising a stationary base plate, a first table arranged in overlying relation to said base plate and movable relative thereto in the X direction, a second table arranged in overlying relation to said first table and movable relative thereto in the Y direction independently of said first table, means for driving said first and second tables to cause mutually independent X- and Y-scannings of the plane of said second table with respect to a stationary laser head, first locking means having a first actuator mounted on said first table and operable during the period of said Y-scanning so as to be brought into pressure engagement with said second table upon the energization of said first actuator to hold said second table against displacement relative to said first table, second locking means having a second actuator mounted on said base plate and operable during the period of said X-scanning so as to be brought into pressure engagement with said first table upon the energization of said second actuator, thereby to hold said first table against displacement relative to said base plate.

2. The scanning mechanism as claimed in claim 1, further comprising a first and second motor means for respectively driving said first and second tables, said first and second actuators each having a presser element operatively associated therewith, said first and second actuators being respectively operable to respectively hold said first and second tables against displacement in respective associated with said first and second motors and said presser elements.

3. The scanning mechanism as claimed in claim 2, in which said presser element of each of said locking means is formed integral with the output member of said respective actuator.

4. The scanning mechanism as claimed in claim 1, in which each of said actuators is in the form of a solenoid.

5. The scanning mechanism as claimed in claim 1, in which said first and second actuators are each fluid-operated.

6. The scanning mechanism as claimed in claim 1, in which said first and second actuators are each vacuum-operated.

7. The scanning mechanism as claimed in claim 2, in which said presser element of said first locking means is in the form of a two-armed lever fulcrumed on said first table and having a longer arm pivotally connected with the output member of said first actuator and a shorter arm engageable with said second table, and said pressure element of said second locking means is in the form of a two-armed lever fulcrumed on said base plate and having a longer arm pivotally connected with the output member of said second actuator and a shorter arm engageable with said first table.

8. The scanning mechanism as claimed in claim 7, in which said first and second actuators are each fluid-operated.

9. The scanning mechanism as claimed in claim 7, in which said first and second actuators are each vacuum-operated.

10. The scanning mechanism as claimed in claim 7, in which each of said actuators is in the form of a solenoid.

* * * * *